United States Patent Office 2,806,004
Patented Sept. 10, 1957

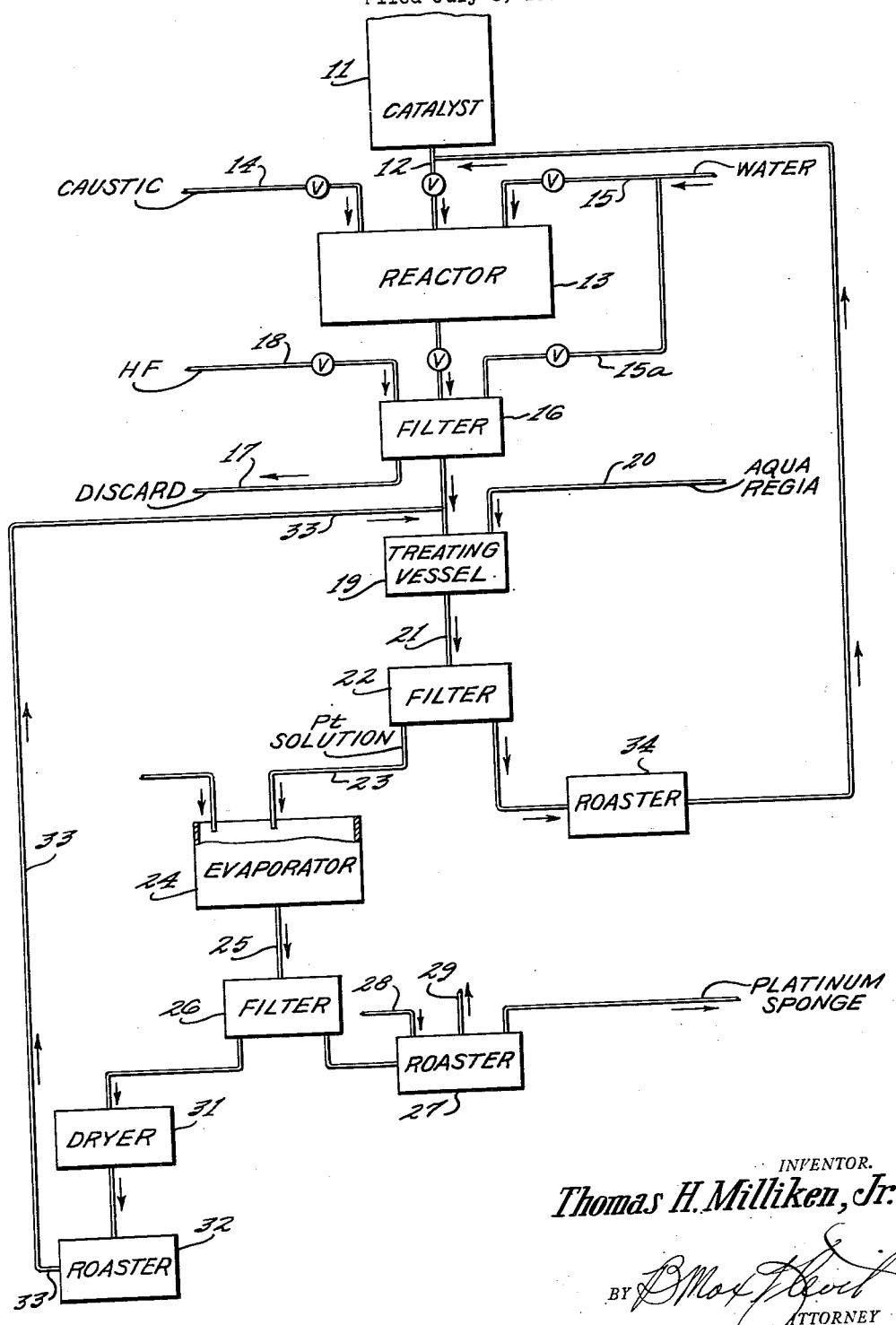

2,806,004
TREATMENT OF PLATINUM-CONTAINING CATALYST

Thomas H. Milliken, Jr., Moylan, Pa., assignor to Houdry Process Corporation, Wilmington, Del., a corporation of Delaware Application July 8, 1953, Serial No. 366,745

8 Claims. (Cl. 252—466)

This application relates to the treatment of platinum-containing catalyst effectively to recover therefrom substantially all of their platinum values. It is specifically concerned with an operation for treating such catalyst whereby a platinum-containing residue is obtained having platinum in high concentration. It is further concerned with the separation and purification of the platinum to obtain high yields of relatively pure platinum.

The use of noble metals in catalysis is relatively well-known. The cost of noble metals, particularly platinum, however, is such that there is a prevailing economic problem associated with their use. The use of such high priced catalyst can be justified economically by an extended operating life period during which period of use conditions are observed to avoid significant loss of platinum, coupled with suitable procedure for recovery of platinum from the catalyst after its useful life period has passed. For certain reactions such as in the reforming of hydrocarbons, it has been found that certain catalysts comprising relatively small amounts of platinum supported on adsorptive alumina give outstanding results and that such catalysts have an economically acceptable operating life period.

Among the objects of this invention is the recovery of substantially all of the platinum from catalysts of this type. Another object is to treat such catalysts to effect the separation and recovery of platinum in a practical and economic fashion. Still another object is the purification of platinum concentrates. Another object is the possible use of such recovered platinum in the preparation of new platinum-containing catalyst. Still another object is the treatment of inactivated platinum-containing catalysts to recover therefrom substantially all of the platinum free of contaminating inactivating components and the reuse of such platinum in the preparation of new catalyst. These and other objects will appear more clearly from the following specification and claims.

In accordance with this invention, platinum-containing catalysts and particularly such catalysts comprising a small amount of platinum supported on alumina are treated with strong caustic solution at sufficiently high pressure to maintain the caustic solution mainly in the liquid phase, and in the temperature range of 300–500° F. By this process substantial solution of most of the components of the catalyst is effected without, however, effecting solution of the platinum content. There is thus obtained upon separation of the treating solution from the undissolved material a residue containing the bulk of the platinum and relatively small amounts of other materials. The thus concentrated platinum value upon suitable further treatment is recovered as substantially pure platinum in metallic form or as a relatively pure platinum-containing compound.

In the drawing:

The figure is a schematic process flow diagram of an embodiment of the invention and is described in greater detail below.

Referring to the diagram, catalyst, containing approximately 2–3% carbon black or other form of solid carbon or carbonaceous material of high carbon content, from a source 11 is passed by means of line 12 into pressure vessel 13 wherein it is admixed with a concentrated solution of sodium hydroxide introduced through line 14 from a suitable source not shown. The carbon black is present primarily as a coagulant and filter aid for the platinum subsequent to the caustic treatment. It may also serve as reducing agent in this operation to insure that the platinum is in a reduced state. This is desirable in that the platinum is generally more resistant to attack by caustic when present in lower valence state and particularly in metallic form. Preferably, the platinum should be substantially completely reduced prior to treatment with the strong caustic solution. In general, the use of carbon or carbon black is preferred as an additive in that it is generally not otherwise affected by the reaction conditions of the actual solution treatment and is subsequently readily removed as by oxidation or filtration. However, the use of carbon additive is not necessarily required, particularly when the caustic solution is quite strong—such as about 50%—but its presence is generally desirable.

With reference to the caustic solution, sodium hydroxide is generally preferred, but other strong alkalies may be substituted without, however, obtaining necessarily equal results. In this particular example, the caustic introduced through line 14 is a 20–50% solution of sodium hydroxide and is in sufficient volume to give approximately 1.2 to 2.0 times NaOH by weight of the catalyst.

In vessel 13 the mixture of catalyst, caustic solution and carbon black is treated as a batch operation and is heated in the range of 300–500° F. and at pressure necessary to retain sufficient of the caustic solution in the liquid phase to insure that all of the catalyst being so treated is in contact with liquid. The reaction vesseel is maintained at these conditions of temperature and pressure for a time-period of at least ½ hour and for longer times when the treating solutions or other conditions are milder. In any event, times in excess of eight to ten hours are not necessary in that no further beneficial action is generally obtained.

When the reaction has been carried out for the desired length of time, the reaction mixture is cooled and diluted with about 10 to 20 parts of water introduced through line 15 and is then removed from reactor 13 to filter 16. The filtrate is removed through line 17 for such uses or for purposes not pertinent to this invention. The filter cake comprising substantially all of the platinum, the carbon black, small amounts of the catalyst support which have not been dissolved by the treatment and such other contaminants or diluents which have not been attacked by the caustic may be treated with a suitable acid, such as hydrofluoric acid, introduced through line 18, which does not attack the platinum while dissolving some of the non-platinum components. After suitable washing with water introduced through line 15a, the filter cake is passed to treating vessel 19 wherein it is treated with a solution comprising 90 parts of concentrated HCl, 47 parts of concentrated H$_2$SO$_4$, 36 parts of concentrated HNO$_3$ and 51 parts of H$_2$O introduced through line 20 to effect solution of the platinum. The material from vessel 19 is passed through line 21 to filter 22 and the filtrate containing the bulk of the platinum is removed through line 23 to evaporator 24. In evaporator 24 the moisture content is reduced to about 25% of the total weight and the residue is then treated with approximately 800 parts of 10% HCl saturated with chlorine gas. The thus treated material is again evaporated to low liquid volume and then treated with ammonium chloride solution containing 28.7 parts of NH$_4$Cl dissolved in 416 parts of water to convert the platinum to ammonium chloroplatinate. Treatment is effected at 90° C. to effect substantially complete reaction.

The solution containing the ammounium chloroplatinate is passed through line 25 to filter 26 and the filter cake is then transferred to roaster 27 in which it is ignited, in the presence of hydrogen introduced through line 28, at a temperature in the range of 500—600° C. until substantially all of the platinate has been decomposed to the substantially pure platinum metal. Excess hydrogen and gases from the ignition in roaster 27 are vented through line 29.

In order to insure as complete recovery of platinum as possible, such solutions or residues which might contain traces of platinum are returned to suitable locations within the system for repeated processing. For example, the filtrate from filter 26 is dried in drier 31 and then passed to roaster 32 wherein it is ignited and the residue is returned through line 33 and is re-introduced with the filter cake from filter 16 into solution tank 19 for reprocessing. Likewise, the filter cake or residue retained on filter 22 is passed to roaster 34 and ignited to eliminate all volatile and combustible materials. The residue from this ignition is returned to line 12 for reintroduction into reactor 13.

The platinum metal thus recovered by process such as described in connection with the drawing is substantially pure and may be adapted by any known and standard methods for any of the uses to which platinum may be put either as metal or by suitable chemical treatment as platinum salts. Of particular interest in connection with the immediate invention is the reuse of this platinum in the preparation of fresh catalyst.

For instance, the platinum sponge thus recovered may be dissolved in aqua regia and the solution dried to drive off the bulk of the nitric acid and further effecting the removal of all of the nitric acid by repeated evaporation with intervening solution in hydrochloric acid, and finally evaporating to the general composition, chloroplatinic acid hexahydrate. This processing step is well-known to the art and it and other treating methods may be used to achieve the desired results. Fresh catalyst may be prepared from this or different soluble platinum compounds by a procedure such as, for example, preparing an aqueous solution of the chloroplatinic acid or of said other soluble platinum compound and impregnating activated alumina pellets to deposit thereon platinum in an amount generally in the range of 0.1 to 3% by weight of the catalyst.

The following examples are illustrative of the procedure of this invention and are to be considered as exemplary embodiments without restricting the scope of the invention.

*Example I*

Ten parts of a spent platinum-containing catalyst having the composition of approximately 99.5% alumina and 0.5% platinum and including hydrocarbonaceous deposit from prior use in the hydrogenative reforming of naphthas was mixed with 50% sodium hydroxide present in an amount of 50 parts. The hydrocarbonaceous deposit in this instance provides the carbon coagulant and filter aid. This mixture was placed in a container at room temperature and sealed and then subjected to relatively rapid heating. At the end of two hours the temperature was approximately 480° F. and was maintained between 400° to 480° F. for the next 5½ hours. The pressure in the sealed container for the last 4 hours was approximately 230 p. s. i. g. The container and its contents were allowed to cool to a temperature approaching room temperature, the container was opened and the contents were diluted with a quantity of water. This material was then filtered and the material retained on the filter was washed with distilled water until substantially free of caustic. There was no postive test of platinum in the filtrate by any of the standard test methods. The material retained on the filter was tranferred to a suitable container and ignited for approximately 16 hours at blast lamp temperature. The ignited material was cooled and leached with a hot 1% HCl solution. The residue was then dissolved in aqua regia and the solution, clarified by filtration, was evaporated to dryness and the residue ignited. The ignited residue upon cooling was weighed and found to be 0.07 part by weight of the original sample and contained better than 98% of the platinum originally present in the catalyst.

*Example II*

Ten parts of the platinum-containing catalyst similar to that used in Example I were mixed with 50 parts of sodium hydroxide solution in a concentration equivalent to approximately 3.82 parts of NaOH to 1 part $Al_2O_3$ and heated in a sealed container at 500° F. for 2 hours at about 240 p. s. i. g. The reaction mixture was cooled, diluted with water and the residue recovered by filtering. After washing, the residue was ignited and, upon analysis, was found to comprise substantially all of the platinum and small amounts of the oxides of aluminum, iron, copper, nickel, manganese and sodium and magnesium.

*Example III*

Ten parts of catalyst similar to that used in the preceding examples were admixed with 40 parts of 30% sodium hydroxide (specific gravity 1.31–1.32) and treated at temperature in the range of 300–500° F. for a time period of less than 2 hours but greater than 1 hour and at pressure in the range of 100–300 p. s. i. g. Upon cooling, the reaction mixture was diluted with 80 parts of distilled water and the insoluble matter recovered by filtration. The undissolved residue after washing, drying and igniting to remove the volatile materials amounted to less than 1% of the original catalyst and contained better than 99% of the platinum originally present in the catalyst.

*Example IV*

The ignited residue from the preceding example was cooled and treated with aqua regia to effect solution of the platinum. The solution was evaporated to dryness and the dry residue taken up in hydrochloric acid was again evaporated to dryness. The treatment with HCl was repeated two more times, the dried material was taken up in dilute hydrochloric acid and the platinum in the solution was converted to the metallic form by warming in the presence of nascent hydrogen obtained by adding to the solution metallic magnesium in an amount of approximately 3 parts of magnesium metal to 4 parts of platinum metal to be recovered. The platinum metal as recovered was substantially free of any arsenic, iron or alumina compounds which were the major contaminants and substantially free of traces of all other contaminants originally present.

The examples have been concerned with catalyst containing 0.5% platinum on an alumina support without, however, intending by such consideration to limit the scope of this invention to any particular range of platinum content. This method of extraction of platinum from platinum-containing catalyst has been applied to catalytic materials containing larger amounts of platinum as well as to samples having as low as 0.2% platinum, with substantially equal success. Further, fresh catalysts prepared by reusing platinum recovered by this treatment, converted to chloroplatinic acid and used to impregnate new activated alumina pellets have shown by test to be the equivalent of similar catalyst using commercially available chloroplatinic acid.

The temperature ranges given as generally in the range of 300–500° F. may be extended both below and above this range making due adjustment, however, of the time-treatment in order that comparable results may be obtained. Such as in a lower temperature range of about 250° F., for example, the time of treatment should be increased by a reasonable amount in order to assure adequate completion of the reaction.

The pressure is critical only in assuring the maintenance of sufficient caustic solution in liquid phase to thoroughly contact the catalyst material being treated. The discussion further has been drawn to platinum on alumina catalyst but support materials other than alumina come within the scope of this invention requiring only such support materials as are soluble by caustic solution treatment in or by the treating condition ranges herein set forth. This invention likewise is of use in the recovery of the other noble metals which may be present in small amounts and which are not appreciably affected in the presence of such caustic treating solutions.

The foregoing description of the separation of solids from liquids has been in terms of filtration; however, other methods of effecting such separations may be used with less or greater effectiveness. Such other means of separation may be, for example, either decantation or by centrifuging.

In connection with the treatment of solids with liquids, such as in the caustic or acid treatments for their selective solution, it may be found desirable to agitate the solid-liquid system by suitable means to insure more uniform and efficient contacting.

Obviously many modifications and variations of the invention as hereinbefore set forth may be made without departing from the spirit and scope thereof, and, therefore, only such limitations should be made as are indicated in the appended claims.

I claim:

1. The process for the recovery of substantially pure platinum from platinum-containing catalyst, comprising admixing such catalyst with a relatively small amount of carbon, treating such admixture with strong caustic solution in the liquid phase at conditions including temperatures in the range of 300–500° F. for a time in the range of 1 hour to 10 hours, effecting the solution of substantially all of the catalyst except the platinum and the carbon which are retained as a residue, separating and recovering said residue, treating said residue at oxidizing conditions to remove said carbon and leaving a platinum concentrate, treating said concentrate with a solution of aqua regia to effect solution of substantially all of the platinum which was initially present in the catalyst, treating such platinum-containing solution to convert the platinum to a chloride salt, separating and recovering said platinum chloride salt and treating said salt to recover substantially pure platinum in an amount substantially equal to the amount of platinum in the catalyst.

2. The process for the recovery of platinum from spent platinum-containing catalyst having a composition of at least 98% alumina and the balance substantially platinum and including a hydrocarbonaceous deposit, comprising admixing such catalyst with solution of 50% sodium hydroxide in an amount of at least 5 times the weight of the catalyst, heating the admixture at temperature up to 500° F. for a time not in excess of 8 hours and under pressure to maintain most of the caustic solution in the liquid phase, separating and recovering undissolved material containing substantially all of the platinum initially present in the catalyst, treating said material at elevated temperatures to remove by ignition the hydrocarbonaceous materials contained therein, recovering the unconsumed residue and treating with dilute acid solution to remove substantially all materials other than platinum, treating the balance containing platinum in aqua regia to dissolve the platinum and form platinum-containing salt, purifying said platinum-containing salt and treating said salt to recover therefrom substantially pure platinum in an amount substantially equal to the amount of platinum in the catalyst.

3. The method of preparing catalyst for hydrogenative reforming reaction and comprising from 0.1 to 3.0% platinum supported on alumina wherein said platinum has been recovered from spent hydrogenative reforming catalyst, such process comprising, treating spent platinum-containing catalyst with an aqueous solution containing 1.5–2 times the catalyst weight of sodium hydroxide present as a 30–50% solution under liquid phase conditions and at temperatures in the range of 300–500° F. for a time period in excess of one hour but less than 10 hours, recovering undissolved residue containing substantially all of the platinum, treating said residue to remove carbon by oxidation and components other than platinum by solution in hydrochloric acid, effecting solution of the platinum from said treated residue in aqua regia, treating said aqua regia solution by repeated evaporation with intervening solution in hydrochloric acid to convert the platinum to chloride salts, separating and recovering substantially pure chloroplatimic acid hexahydrate; separately preparing relatively pure alumina base support and impregnating said base support with a solution of said chloroplatinic acid hexahydrate, calcining said impregnated base at reducing conditions, and obtaining catalyst for hydrogenative reforming composed substantially completely of 0.1 to 3% platinum and the remainder alumina.

4. The method of recovering platinum from spent hydrogenative reforming catalyst composed essentially of 0.1 to 3% platinum on an alumina support, said process comprising effecting solution of the major portion of such catalyst by treatment with strong caustic solution at temperatures in the range of 300–500° F. for a time period of 5 to 8 hours, recovering the residue of said treatment, water washing said residue to remove caustic and soluble salts, acid treating said washed residue with hydrochloric acid under conditions where substantially no platinum is dissolved to effect solution of residual portions of alumina and possible contaminants, washing the acid-treated residue and igniting the residue to remove any organic reducing agent present therein, effecting solution of the platinum contained in said ignited residue in aqua regia, treating said aqua regia solution by repeated evaporation with intervening solution in hydrochloric acid to convert the platinum to chloride salt, separately recovering said platinum chloride salt therefrom and decomposing said platinum chloride salt to recover substantially pure platinum in an amount substantially equal to the amount of platinum in the catalyst.

5. The process for recovering platinum from spent hydrogenative reforming catalyst consisting chiefly of 0.1–3.0% platinum supported on alumina comprising introducing such catalyst into a pressure vessel, adding thereto approximately 1.5–2 times the weight of the catalyst of sodium hydroxide in an aqueous solution with concentration of 30–50%, sealing said vessel and heating at temperature in the range of 300–500° F. for at least 6 hours under pressure conditions whereby the bulk of said caustic solution is in liquid phase, cooling said vessel, releasing the pressure and diluting with 10–20 times the volume of reaction mixture with water, filtering the diluted mixture, obtaining a filter cake, washing said filter cake and treating with mild dilute acid, washing said acid treated filter cake and passing to ignition treatment, effecting oxidative removal therefrom of any organic agents present therein; passing such ignited filter cake to a treating zone and contacting said filter cake therein with a solution of aqua regia, dissolving the platinum, recovering such solution and passing said solution to an evaporator, evaporating the bulk of the liquid, combining said partially evaporated solution with a substantial excess of 10% hydrochloric acid saturated with chlorine gas, evaporating said last combination to low liquid volume, treating said low liquid volume material with a large excess of dilute ammonium chloride solution at about 90° C., passing the partially evaporated solution to a drier, evaporating to a dry residue consisting of ammonium chloroplatinate, igniting said dried residue and recovering said ignited residue comprising substantially only platinum.

6. The process for recovering platinum from spent hydrogenative reforming catalyst consisting chiefly of 0.1–3.0% platinum supported on alumina and containing coke deposit from such reforming, comprising subjecting successive batches of such catalyst to treatment with approximately 1.5–2 times the weight of the catalyst of sodium hydroxide in aqueous solution having a concentration in the range of 30–50% and at conditions including a temperature in the range of 300–500° F., pressure sufficiently high to maintain the bulk of the sodium hydroxide solution in the liquid phase and for time of at least 6 hours but less than 10 hours; subsequently diluting the product of each batch treat with approximately 10–20 volumes of water, filtering said dlute solution to recover a filter cake containing substantially all of the platinum, treating said filter cake with mild acid to effect at least partial removal of components other than platinum, water washing said acid treated filter cake and subsequently treating said cake with aqua regia to effectively dissolve substantially all of said platinum, recovering said dissolved platinum as a filtrate by filtration separation from undissolved residue; igniting said residue and returning said ignited residue to retreatment in said sodium hydroxide batch treatment, partially evaporating said filtrate and further treating to convert said dissolved platinum to substantially only chloride salts, precipitating said platinum chloride salts and recovering said precipitated salts as a filter cake; recovering the filtrate from the separation of said precipitated platinum salts, evaporating said last-mentioned filtrate to dryness, igniting the residue of said last-mentioned evaporation and returning said last-mentioned residue to retreatment with said previously-mentioned aqua regia; igniting said last-mentioned filter cake and recovering an ignited product consisting substantially of the platinum.

7. The process comprising the steps of subjecting an inactivated catalyst consisting predominantly of an aluminaceous support, from 0.1 to 3% platinum, and minor amounts of carbonaceous and inorganic contaminants, to the action of liquid strong caustic solution under pressure at a temperature in the range from 300° F. to 500° F. for from 1 to 10 hours to effect the solution of most of said support without dissolving any of the platinum; separating and recovering substantially all of the initially present platinum in the undissolved residue from such pressurized caustic treatment; water washing said residue, acid treating said washed residue with hot 1% hydrochloric acid to dissolve inorganic contaminants, retaining substantially all of the initially present platinum in said residue; washing the acid treated residue; oxidizing the carbonaceous contaminants in said washed residue to prepare a residue free from organic matter; treating said organic-free residue with aqua regia to prepare a solution containing substantially all of the initially present platinum; and preparing from said aqua regia solution a solution consisting only of highly purified chloroplatinic acid containing substantially all of the initially present platinum.

8. The method of preparing a catalyst comprising the steps of claim 7 and the impregnation of said highly purified chloroplatinic acid into a solid aluminaceous carrier.

References Cited in the file of this patent

UNITED STATES PATENTS

| 1,228,119 | Lawrie | May 29, 1917 |
| 2,316,330 | Hawk | Apr. 13, 1943 |
| 2,344,208 | Kirkpatrick | Mar. 14, 1944 |
| 2,479,109 | Haensel | Aug. 16, 1949 |